(12) United States Patent
Dearden et al.

(10) Patent No.: US 11,676,466 B2
(45) Date of Patent: *Jun. 13, 2023

(54) SELF-CALIBRATING FIRE SENSING DEVICE

(71) Applicant: Honeywell International Inc., Morris Plains, NJ (US)

(72) Inventors: Christopher Dearden, Melton Mowbray (GB); Michael Barson, Nuneaton (GB); Benjamin Wolf, Leicester (GB)

(73) Assignee: Honeywell International Inc., Charlotte, NC (US)

( * ) Notice: Subject to any disclaimer, the term of this patent is extended or adjusted under 35 U.S.C. 154(b) by 355 days.

This patent is subject to a terminal disclaimer.

(21) Appl. No.: 16/997,743

(22) Filed: Aug. 19, 2020

(65) Prior Publication Data

US 2022/0058929 A1 Feb. 24, 2022

(51) Int. Cl.
  *G08B 17/107* (2006.01)
  *G01N 15/06* (2006.01)
  (Continued)

(52) U.S. Cl.
  CPC .......... *G08B 17/107* (2013.01); *G01N 15/06* (2013.01); *G08B 29/28* (2013.01); *G01N 2015/0046* (2013.01); *G01N 2015/0693* (2013.01)

(58) Field of Classification Search
  None
  See application file for complete search history.

(56) References Cited

U.S. PATENT DOCUMENTS

| 5,473,314 A | 12/1995 | Mochizuki et al. |
| 5,497,144 A | 3/1996 | Schaeppi et al. |

(Continued)

FOREIGN PATENT DOCUMENTS

| AU | 2007203107 A9 * | 4/2009 | ........... G01F 1/6842 |
| AU | 2010200806 A1 * | 3/2010 | ........... G01F 1/6842 |

(Continued)

OTHER PUBLICATIONS

Extended European Search Report for related EP Application No. 21189998.4, dated Jan. 18, 2022 (8 pgs).

*Primary Examiner* — Fekadeselassie Girma
(74) *Attorney, Agent, or Firm* — Brooks, Cameron & Huebsch, PLLC (57) ABSTRACT

Devices, methods, and systems for a self-calibrating fire sensing device are described herein. One device includes an adjustable particle generator and a variable airflow generator configured to generate aerosol having a particular particle size and optical scatter properties at a controllable density level, a first transmitter light-emitting diode (LED) configured to emit a first light that passes through the aerosol, a second transmitter LED configured to emit a second light that passes through the aerosol, a photodiode configured to detect a scatter level of the first light that passes through the aerosol and detect a scatter level of the second light that passes through the aerosol, and a controller configured to calibrate a gain of the photodiode based on the detected scatter level of the first light, the detected scatter level of the second light, and the controllable aerosol density level.

20 Claims, 4 Drawing Sheets

(51) Int. Cl.
*G08B 29/28* (2006.01)
*G01N 15/00* (2006.01)

(56) References Cited

U.S. PATENT DOCUMENTS

| | | | | |
|---|---|---|---|---|
| 5,936,533 | A * | 8/1999 | Bernal | G08B 29/145 |
| | | | | 340/630 |
| 7,934,411 | B2 * | 5/2011 | Koch | G08B 29/145 |
| | | | | 73/1.06 |
| 8,933,811 | B2 * | 1/2015 | Hojmose | G08B 17/107 |
| | | | | 340/693.11 |
| 9,568,361 | B2 * | 2/2017 | Nakata | G01J 1/44 |
| 9,659,485 | B2 * | 5/2017 | Piccolo, III | G08B 29/145 |
| 9,959,748 | B2 * | 5/2018 | Moffa | G08B 29/145 |
| 10,467,874 | B2 | 11/2019 | Fischer et al. | |
| 10,495,573 | B1 * | 12/2019 | Caubel | G01N 21/61 |
| 11,024,154 | B1 * | 6/2021 | Lang | G08B 29/20 |
| 11,127,284 | B1 * | 9/2021 | Barson | G08B 29/28 |
| 2018/0308346 | A1 * | 10/2018 | Allemann | G08B 29/26 |
| 2019/0164415 | A1 * | 5/2019 | Kuhn-Matysiak | G08B 29/20 |
| 2020/0250963 | A1 | 8/2020 | Rodriguez | |
| 2020/0256782 | A1 * | 8/2020 | Hairston | G01N 15/1459 |
| 2021/0065536 | A1 | 3/2021 | Dearden et al. | |
| 2021/0134136 | A1 * | 5/2021 | Bistany | G01K 13/00 |

FOREIGN PATENT DOCUMENTS

| | | | | |
|---|---|---|---|---|
| CN | 1111922 | A | 11/1995 | |
| CN | 1281200 | A | 1/2001 | |
| CN | 102455288 | A | 5/2012 | |
| CN | 109155097 | A | 1/2019 | |
| CN | 110799823 | A * | 2/2020 | G01N 15/0618 |
| CN | 114078312 | A * | 2/2022 | G01N 15/06 |
| DE | 20215640 | U1 | 2/2003 | |
| EP | 2527818 | A2 * | 11/2012 | G01F 1/7086 |
| EP | 3489921 | A1 | 5/2019 | |
| GB | 2176600 | A | 12/1986 | |
| GB | 2459322 | A | 10/2009 | |
| PT | 1709428 | E * | 10/2007 | |
| WO | 0072282 | A1 | 11/2000 | |
| WO | 0227293 | A2 | 4/2002 | |

* cited by examiner

SELF-CALIBRATING FIRE SENSING DEVICE

TECHNICAL FIELD

The present disclosure relates generally to devices, methods, and systems for a self-calibrating optical smoke chamber within a fire sensing device.

BACKGROUND

Large facilities (e.g., buildings), such as commercial facilities, office buildings, hospitals, and the like, may have a fire alarm system that can be triggered during an emergency situation (e.g., a fire) to warn occupants to evacuate. For example, a fire alarm system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms. Fire sensing devices can include one or more sensors. The one or more sensors can include an optical smoke sensor, a heat sensor, a gas sensor, and/or a flame sensor, for example.

Over time components of a fire sensing device can degrade and/or become contaminated and fall out of their initial operational specifications. For example, an output of a light-emitting diode (LED) used in an optical scatter chamber of a smoke detector can degrade with age and/or use. These degraded components can prevent the fire sensing device from detecting a fire at an early enough stage. As such, codes of practice require sensitivity testing (e.g., alarm threshold verification testing) of smoke detectors at regular intervals. However, accurate sensitivity testing on site can be impractical due to access problems and the need to deploy specialist equipment to carry out the testing. Consequently, rudimentary functionality tests are almost always done in lieu of accurate sensitivity tests which are misleading by inaccurately depicting the sensitivity of a smoke detector as being verified.

In some countries, because an accurate sensitivity of the smoke detector may not be able to be determined and/or testing is not performed, devices are required to be replaced after a particular time period. For example, in Germany, even the most advanced smoke detector must be replaced after 8 years, even though the device may still be performing accurately. This can create unnecessary waste which can negatively impact the environment.

DETAILED DESCRIPTION

Devices, methods, and systems for a self-calibrating optical smoke chamber, within a fire sensing device are described herein. One device includes an adjustable particle generator and a variable airflow generator configured to generate aerosol having a particular particle size and optical scatter properties at a controllable density level, a first transmitter light-emitting diode (LED) configured to emit a first light that passes through the aerosol, a second transmitter LED configured to emit a second light that passes through the aerosol, a photodiode configured to detect a scatter level of the first light that passes through the aerosol and detect a scatter level of the second light that passes through the aerosol, and a controller configured to calibrate a gain of the photodiode based on the detected scatter level of the first light, the detected scatter level of the second light, and the controllable aerosol density level.

In contrast to previous smoke detectors in which a maintenance engineer would have to manually test sensitivity of a smoke detector and replace the smoke detector if the smoke sensitivity was incorrect, the smoke detectors in accordance with the present disclosure can test, calibrate, and/or recalibrate themselves. Accordingly, fire sensing devices in accordance with the present disclosure may take significantly less maintenance time to test and can be tested, calibrated, and/or recalibrated continuously and/or on demand, and can more accurately determine the ability of a fire sensing device to detect an actual fire. As such, self-calibrating fire sensing devices may have extended service lives and be replaced less often resulting in a positive environmental impact.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2A.

As used herein, "a", "an", or "a number of" something can refer to one or more such things, while "a plurality of" something can refer to more than one such things. For example, "a number of components" can refer to one or more components, while "a plurality of components" can refer to more than one component.

Figure 1:
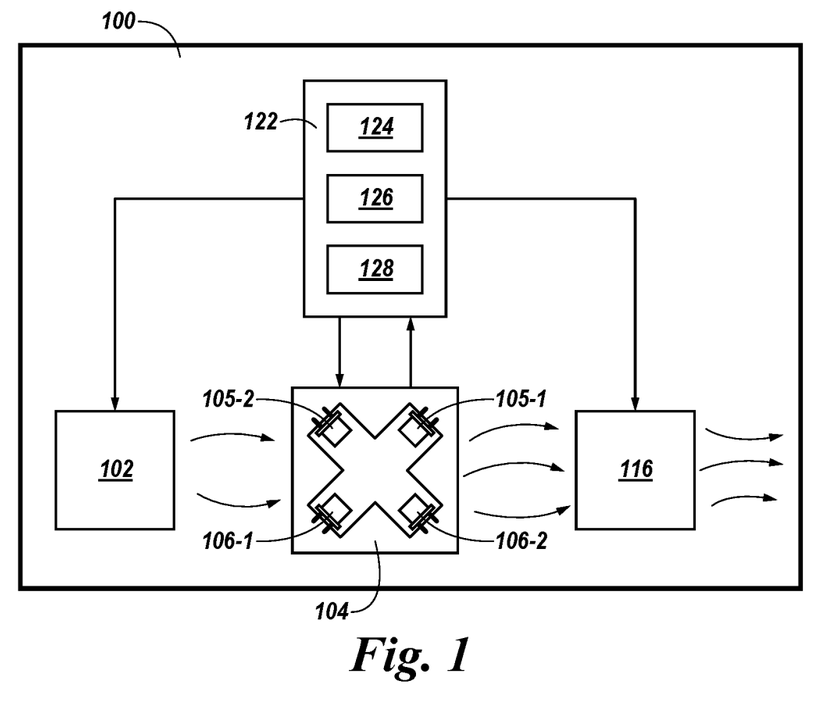
FIG. 1 illustrates a block diagram of a smoke self-test function of a self-calibrating fire sensing device in accordance with an embodiment of the present disclosure.

FIG. 1 illustrates a block diagram of a smoke verification test function of a self-calibrating fire sensing device 100 in accordance with an embodiment of the present disclosure. The fire sensing device 100 includes a controller 122, an adjustable particle generator 102, an optical scatter chamber 104, and a variable airflow generator 116.

The controller 122 can include a memory 124, a processor 126, and circuitry 128. Memory 124 can be any type of storage medium that can be accessed by processor 126 to perform various examples of the present disclosure. For example, memory 124 can be a non-transitory computer readable medium having computer readable instructions (e.g., computer program instructions) stored thereon that are executable by processor 126 to test, calibrate, and/or recalibrate a fire sensing device 100 in accordance with the present disclosure. For instance, processor 126 can execute the executable instructions stored in memory 124 to generate aerosol having a controllable density level, emit a first light that passes through the aerosol, emit a second light that passes through the aerosol, detect a scatter level of the first light that passes through the aerosol, detect a scatter level of the second light that passes through the aerosol, and calibrate a gain of a photodiode based on the detected scatter level of the first light, the detected scatter level of the second light, and the controllable aerosol density level. In some examples, memory 124 can store the detected scatter level of the first light and/or the detected scatter level of the second light.

In a number of embodiments, the controller 122 can send a command to the adjustable particle generator 102 and the variable airflow generator 116 to generate particles. A particle size of the particles can be well defined and repeatable by the adjustable particle generator 102 to have scatter properties at different wavelengths and/or different angles be the same and/or within a particular threshold. The particles can be drawn through the optical scatter chamber 104 via the variable airflow generator 116 creating a controlled and known aerosol density level. The optical scatter chamber 104 can include transmitter LEDs 105-1 and 105-2 and photodiodes 106-1 and 106-2 to measure the aerosol density level by detecting scatter levels. Scatter can be light from the transmitter LEDs 105-1 and/or 105-2 reflecting, refracting, and/or diffracting off of particles and can be received by the photodiodes 106-1 and/or 106-2. The amount of light received by the photodiodes 106-1 and/or 106-2 can be used to determine the aerosol density level.

Transmitter LED 105-1 can emit a first light and transmitter LED 105-2 can emit a second light. Photodiode 106-1 can detect a scatter level of the first light and/or the second light and photodiode 106-2 can detect a scatter level of the first light and/or the second light.

Transmitter LEDs 105-1 and 105-2, which may be referred to herein collectively as transmitter LEDs 105, can have varying LED emission levels due to, for example, manufacturing variations. As such, transmitter LEDs 105 may require calibration prior to use. The fire sensing device 100 can calibrate the transmitter LEDs 105 by producing a known aerosol density level, as described above. The photodiodes 106-1 and 106-2, which may be referred to herein collectively as photodiodes 106, can detect scatter levels and the controller 122 can compare the detected scatter levels with the known aerosol density level to calculate a sensitivity for each scatter path. For example, transmitter LED 105-1 can emit a first light and photodiode 106-1 and/or photodiode 106-2 can detect the scatter level from the first light scattering off of the particles of the known aerosol density level. The controller 122 can calculate a sensitivity, based on the detected scatter level and the known aerosol density level, for the scatter path of transmitter LED 105-1 to photodiode 106-1 and/or the scatter path of transmitter LED 105-1 to photodiode 106-2. The controller 122 can similarly calculate a sensitivity for the scatter path of transmitter LED 105-2 to photodiode 106-1 and/or the scatter path of transmitter LED 105-2 to photodiode 106-2. The sensitivity for each scatter path can be stored in memory 124.

In some examples, the sensitivity accuracy can be improved by recalibrating a gain used to amplify the input signal of a photodiode 106. For example, an amplifier gain can be increased to increase the voltage and/or current of the input signal of photodiode 106-2 to detect the first light from transmitter LED 105-1 as the first light from transmitter LED 105-1 weakens over time. A gain of the amplifier can be recalibrated (e.g., modified) responsive to the detected scatter level. For example, a gain of the amplifier can be recalibrated responsive to a calculated sensitivity of a scatter path being less than a threshold sensitivity.

In a number of embodiments, a fault (e.g., an error) can be triggered responsive to the detected scatter level. For example, the controller 122 can compare the detected scatter level to a threshold scatter level and trigger a fault responsive to the detected scatter level being below the threshold scatter level. Another example can include the controller 122 comparing the detected scatter level to a previously detected scatter level and triggering a fault responsive to the detected scatter level being less than the previously detected scatter level.

Each amplifier gain can be calibrated by storing the initial detected scatter level and each amplifier gain in memory 124. Over time LED emission levels of transmitter LEDs 105 can decrease, reducing the received light by the photodiode 106, which could lead to the fire sensing device 100 malfunctioning.

The amplifier gain used by photodiode 106 for detecting scatter levels can be recalibrated as the transmitter LED degrades over time. Controller 122 can recalibrate the gain responsive to the detected scatter level. For example, the controller 122 can initiate a recalibration of the gain responsive to comparing the detected scatter level to a threshold scatter level and determining the detected scatter level is below the threshold scatter level. In some examples, the controller 122 can recalibrate the gain responsive to determining a difference between the detected scatter level and the initial detected scatter level is greater than a threshold value and/or responsive to determining the detected scatter level is less than a previously detected scatter level.

In a number of embodiments, the first sensing device 100 can further include a sensor, not illustrated. The sensor can measure ambient airflow outside of the fire sensing device 100. The ambient airflow can be measured prior to the adjustable particle generator 102 and the variable airflow generator 116 generating the aerosol. If the measured ambient airflow is within a particular airflow range, the adjustable particle generator 102 and the variable airflow generator 116 can generate the aerosol.

In some examples, the fire sensing device 100 can communicate with a heating, ventilation, and air conditioning (HVAC) system, not illustrated, via a wired or wireless network. The wired or wireless network will be further discussed in connection with FIG. 3. The HVAC system can send the current settings of the HVAC system to the fire sensing device 100. The fire sensing device 100 including the controller 122 can receive the settings from the HVAC system and generate aerosol and/or recalibrate a gain based on the settings of the HVAC system. For example, the fire sensing device can generate aerosol and/or recalibrate the gain in response to the HVAC system being turned off.

FIG. 2A illustrates an example of a self-calibrating fire sensing device 200 in accordance with an embodiment of the present disclosure. The fire sensing device 200 can be, but is not limited to, a fire and/or smoke detector of a fire control system, and can be, for instance, fire sensing device 100 previously described in connection with FIG. 1. The self-calibrating fire sensing device 200 illustrated in FIG. 2A can include an optical scatter chamber 204 including a single transmitter LED 205 with dual wavelengths and a single photodiode 206, which can correspond to the optical scatter chamber 104, the transmitter LED 105, and the photodiode 106 of FIG. 1, respectively.

Figure 2A:
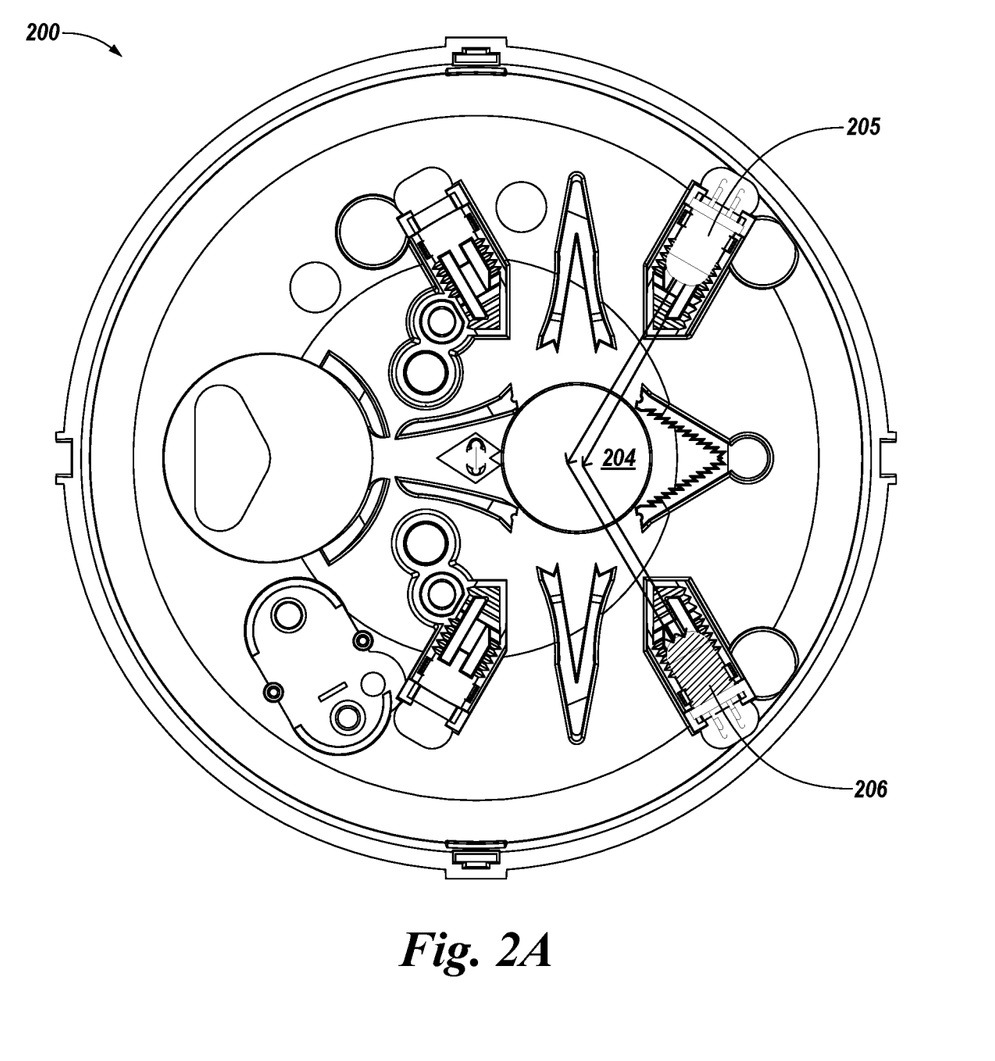
FIG. 2A illustrates an example of a self-calibrating fire sensing device in accordance with an embodiment of the present disclosure.

A fire sensing device 200 can sense a fire occurring in a facility and trigger a fire response to provide a notification of the fire to occupants of the facility. A fire response can include visual and/or audio alarms, for example. A fire response can also notify emergency services (e.g., fire departments, police departments, etc.) In some examples, a plurality of fire sensing devices can be located throughout a facility (e.g., on different floors and/or in different rooms of the facility).

A fire sensing device 200 can automatically or upon command conduct one or more tests contained within the fire sensing device 200. The one or more tests can determine whether the fire sensing device 200 is functioning properly, requires maintenance, and/or requires recalibration.

As previously discussed in connection with FIG. 1, a fire sensing device 200 can further include an adjustable particle generator and a variable airflow generator, which can correspond to the adjustable particle generator 102 and the variable airflow generator 116 of FIG. 1, respectively. The adjustable particle generator of the fire sensing device 200 can generate particles which can be mixed into a controlled aerosol density level by the variable airflow generator. The aerosol density level can be a particular level that can be detected by an optical scatter chamber 204. Once the aerosol density level has reached the particular level, the adjustable particle generator can be turned off and the variable airflow generator can increase the rate of airflow through the optical scatter chamber 204. The variable airflow generator can increase the rate of airflow through the optical scatter chamber 204 to reduce the aerosol density level back to an initial level of the optical scatter chamber 204 prior to the adjustable particle generator generating particles. For example, the variable airflow generator can remove the aerosol from the optical scatter chamber 204 after the scatter levels described herein are detected.

The adjustable particle generator can include a reservoir to contain a liquid and/or wax used to create particles. The adjustable particle generator can also include a heat source. The heat source can be a coil of resistance wire. A current flowing through the wire can be used to control the temperature of the heat source and further control the number of particles produced by the adjustable particle generator. The heat source can heat the liquid and/or wax to create airborne particles to simulate smoke from a fire. The particles can measure approximately 1 micrometer in diameter and/or the particles can be within the sensitivity range of the optical scatter chamber 204. The heat source can heat the liquid and/or wax to a particular temperature and/or heat the liquid and/or wax for a particular period of time to generate an aerosol density level sufficient to trigger a fire response from a properly functioning fire sensing device 200 without saturating the optical scatter chamber 204. The ability to control the aerosol density level can allow a smoke test to more accurately mimic the characteristics of a fire and prevent the optical scatter chamber 204 from becoming saturated.

As previously described, the detected scatter levels from the smoke test can be used to determine whether fire sensing device 200 requires maintenance and/or recalibration. For example, the fire sensing device 200 can be determined to require maintenance and/or recalibration responsive to a calculated sensitivity, calculated using the detected scatter level and the known aerosol density level, being outside a sensitivity range.

In some examples, the fire sensing device 200 can generate a message if the device requires maintenance (e.g., if the sensitivity is outside a sensitivity range). The fire sensing device 200 can send the message to a monitoring device (e.g., monitoring device 401 in FIG. 4), for example. As an additional example, the fire sensing device 200 can include a user interface that can display the message.

The fire sensing device 200 of FIG. 2A illustrates transmitter LED 205 and photodiode 206. Transmitter LED 205 can emit a first light and a second light. In some examples, the first light can have a first wavelength and the second light can have a second wavelength. For example, transmitter LED 205 can include an infrared (IR) LED with a first wavelength and a blue LED with a second wavelength. Having two or more different wavelengths can help the fire sensing device 200 detect various types of smoke. For example, a first wavelength can better detect a flaming fire including black aerosol and a second wavelength can better detect water vapor including white non-fire aerosol. In some examples, a ratio of the first wavelength and the second wavelength can be used to indicate the type of smoke.

As shown in FIG. 2A, photodiode 206 can receive a scatter of the first light and/or the second light from transmitter LED 205. Photodiode 206 can detect a scatter level of the first light and/or a scatter level of the second light. In a number of embodiments, photodiode 206 can be a transmitter LED.

Transmitter LEDs 205, can have varying LED emission levels due to, for example, manufacturing variations. As such, transmitter LEDs 205 may require calibration prior to use. The fire sensing device 200 can calibrate the transmitter LED 205 by producing a known aerosol density level, as described above. The photodiode 206 can detect scatter levels, which can be compared with the known aerosol density level to calculate a sensitivity for each scatter path.

In some examples, the sensitivity accuracy can be improved by modifying a gain used to amplify the input signal of photodiode 206, as previously described herein. A gain of photodiode 206 can be recalibrated responsive to the detected scatter level, as previously described herein.

Figure 2B:
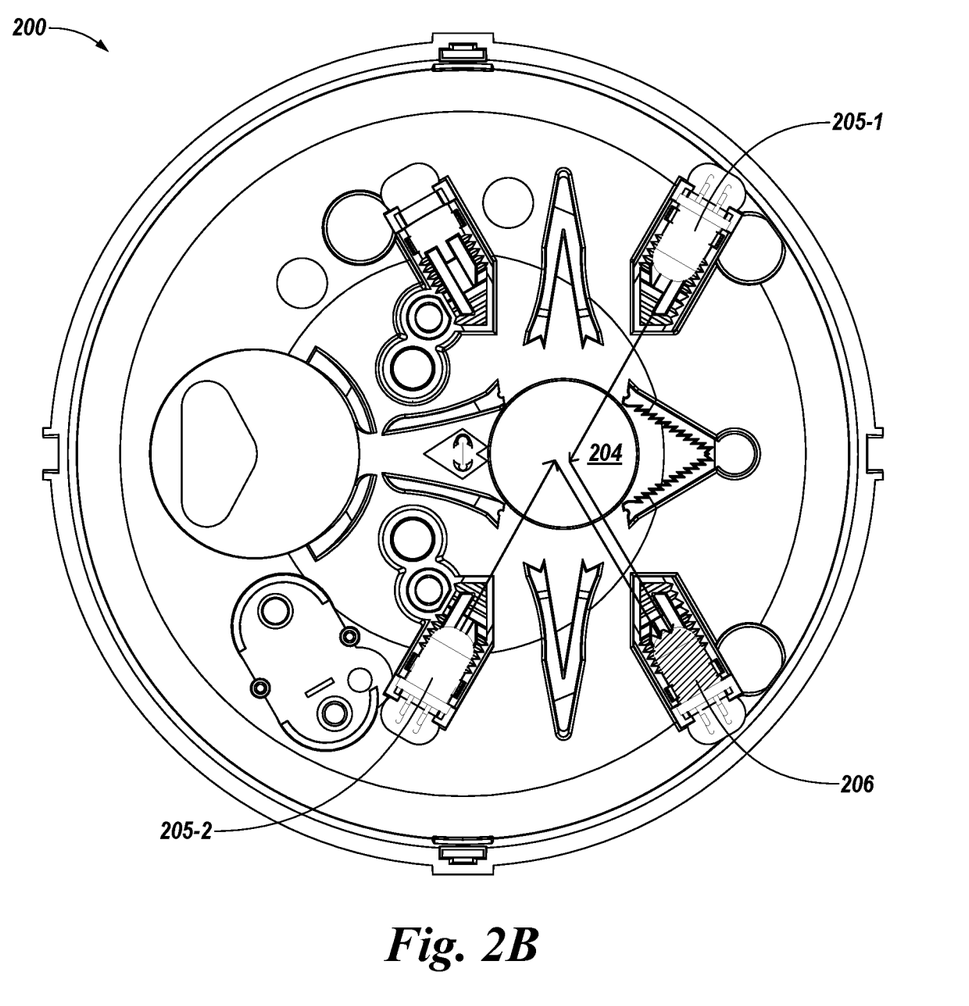
FIG. 2B illustrates an example of a self-calibrating fire sensing device in accordance with an embodiment of the present disclosure.

FIG. 2B illustrates an example of a self-calibrating fire sensing device 200 in accordance with an embodiment of the present disclosure. The fire sensing device 200 of FIG. 2B can include an optical smoke chamber 204 including a transmitter LED 205-1, a transmitter LED 205-2, and a photodiode 206. Fire sensing device 200, optical smoke chamber 204, transmitter LED 205-1, transmitter LED 205-2, and photodiode 206 can correspond to fire sensing device 100, optical scatter chamber 104, transmitter LED 105, and photodiode 106 of FIG. 1, respectively.

As previously discussed in connection with FIG. 2A, a fire sensing device 200 can sense a fire occurring in a facility and can automatically or upon command conduct one or more tests contained within the fire sensing device 200 to determine whether the fire sensing device 200 is functioning properly, requires maintenance, and/or requires recalibration.

As previously discussed in connection with FIG. 1, a fire sensing device 200 can further include an adjustable particle generator and a variable airflow generator, which can correspond to the adjustable particle generator 102 and the variable airflow generator 116 of FIG. 1, respectively. The adjustable particle generator of the fire sensing device 200 can generate particles which can be mixed into a controlled aerosol density level by the variable airflow generator. The aerosol density level can be a particular level that can be detected by an optical scatter chamber 204.

As previously described, detected scatter levels can be used to determine whether fire sensing device 200 requires maintenance and/or recalibration. For example, the fire sensing device 200 can be determined to require maintenance and/or recalibration responsive to a sensitivity, calculated using the detected scatter level and the known aerosol density level, being below a threshold sensitivity.

In some examples, the fire sensing device 200 can generate a message if the device requires maintenance (e.g., if the sensitivity is below a threshold sensitivity). The fire sensing device 200 can send the message to a monitoring device (e.g., monitoring device 401 in FIG. 4), for example. As an additional example, the fire sensing device 200 can include a user interface that can display the message.

The fire sensing device 200 of FIG. 2B illustrates transmitter LED 205-1, transmitter LED 205-2, and photodiode 206. Transmitter LED 205-1 can emit a first light and transmitter LED 205-2 can emit a second light. Transmitter LED 205-1 and/or transmitter LED 205-2 can be located at particular angles from photodiode 206 to detect various types of smoke. For example, transmitter LED 205-1 can be located approximately 120 degrees from photodiode 206 and/or transmitter LED 205-2 can be located approximately 60 degrees from photodiode 206.

As shown in FIG. 2B, photodiode 206 can receive the first light from transmitter LED 205-1 and/or the second light from transmitter LED 205-2. Photodiode 206 can detect a scatter level of the first light and/or a scatter level of the second light.

Transmitter LEDs 205, can have varying LED emission levels due to, for example, manufacturing variations. As such, transmitter LEDs 205 may require calibration prior to use. The fire sensing device 200 can calibrate the transmitter LED 205-1 and/or transmitter LED 205-2 by producing a known aerosol density level, as described above. The photodiode 206 can detect scatter levels, which can be compared with the known aerosol density level to calculate a sensitivity for each scatter path, as previously described herein. In some examples, the sensitivity accuracy can be improved by modifying a gain used to amplify the input signal of photodiode 206 responsive to one or more detected scatter levels.

FIG. 3 illustrates a block diagram of a system 320 including a self-calibrating fire sensing device 300 in accordance with an embodiment of the present disclosure. Fire sensing device 300 can be, for example, fire sensing device 100 and/or 200 previously described in connection with FIGS. 1, 2A, and 2B, respectively. The system 320 can further include a monitoring device 301.

The monitoring device 301 can be a control panel, a fire detection control system, and/or a cloud computing device of a fire alarm system, for example. The monitoring device 301 can be configured to send commands to and/or receive test, calibration, and/or recalibration results from a fire sensing device 300 via a wired or wireless network. For example, the fire sensing device 300 can transmit (e.g., send) the monitoring device 301 a message responsive to the fire sensing device 300 determining that the fire sensing device 300 requires maintenance and/or requires recalibration. The fire sensing device 300 can also transmit a message responsive to calibrating the fire sensing device 300, failing to calibrate the fire sensing device 300, recalibrating the fire sensing device 300, failing to recalibrate the fire sensing device 300, detecting a scatter level at the fire sensing device 300, and/or failing to detect a scatter level at the fire sensing device 300.

In a number of embodiments, the fire sensing device 300 can transmit data to the monitoring device 301. For example, the fire sensing device 300 can transmit detected scatter levels. In some examples, the monitoring device 301 can receive messages and/or data from a number of fire sensing devices analogous to fire sensing device 300.

The monitoring device 301 can include a controller 332 including a memory 334, a processor 336, and a user interface 338. Memory 334 can be any type of storage medium that can be accessed by processor 336 to perform various examples of the present disclosure. For example, memory 334 can be a non-transitory computer readable medium having computer readable instructions (e.g., computer program instructions) stored thereon that are executable by processor 336 in accordance with the present disclosure. For instance, processor 336 can execute the executable instructions stored in memory 334 to generate aerosol, emit a first light that passes through the aerosol, emit a second light that passes through the aerosol, detect a scatter level of the first light that passes through the aerosol, detect a scatter level of the second light that passes through the aerosol, and recalibrate a gain of the photodiode based on the detected scatter level of the first light or the detected scatter level of the second light. In some examples, memory 334 can store previously detected scatter levels, the detected scatter levels, and/or scatter specification ranges.

In a number of embodiments, the controller 332 can send a command to the fire sensing device 300 to recalibrate a gain of a photodiode (e.g., photodiode 206 in FIGS. 2A and 2B) of the fire sensing device 300. In some examples, the command can include a gain setting for the photodiode. The controller 332 can determine a gain setting based on the detected scatter level received from the fire sensing device 300. The controller 332 can compare the detected scatter level with a scatter level range, previously detected scatter levels, and/or detected scatter levels of a different fire sensing device. The fire sensing device 300 can recalibrate the gain of the photodiode based on the comparison.

In a number of embodiments, the monitoring device 301 can include a user interface 338. The user interface 338 can be a GUI that can provide and/or receive information to and/or from a user and/or the fire sensing device 300. The user interface 338 can display messages and/or data received from the fire sensing device 300. For example, the user interface 338 can display an error notification responsive to a detected scatter level being outside of a scatter specification range.

The networks described herein can be a network relationship through which the fire sensing device 300, the monitoring device 301, a sensor, and/or an HVAC system communicate with each other. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from and transmit information to fire sensing device 300 and monitoring device 301, via a wired or wireless network.

Figure 3:
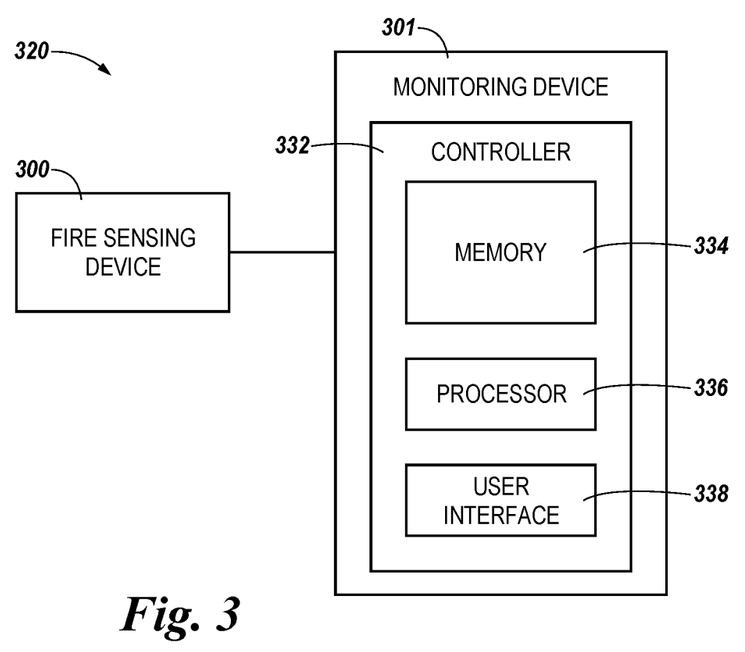
FIG. 3 illustrates a block diagram of a system including a self-calibrating fire sensing device in accordance with an embodiment of the present disclosure.

As used herein, a "network" can provide a communication system that directly or indirectly links two or more computers and/or peripheral devices and allows a monitoring device 301 to access data and/or resources on a fire sensing device 300 and vice versa. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A self-calibrating fire sensing device, comprising:
    an adjustable particle generator and a variable airflow generator configured to generate aerosol having a particular particle size and optical scatter properties at a controllable density level;
    a first transmitter light-emitting diode (LED) configured to emit a first light that passes through the aerosol;
    a second transmitter LED configured to emit a second light that passes through the aerosol;
    a photodiode configured to:
        detect a scatter level of the first light that passes through the aerosol; and
        detect a scatter level of the second light that passes through the aerosol; and
    a controller configured to calibrate a gain of the photodiode based on the detected scatter level of the first light, the detected scatter level of the second light, and the controllable aerosol density level.

2. The device of claim 1, further comprising an additional photodiode
    configured to: detect an additional scatter level of the first light that passes through the aerosol; and
    detect an additional scatter level of the second light that passes through the aerosol.

3. The device of claim 2, wherein the controller is configured to calibrate the gain of the photodiode based on the detected additional scatter level of the first light and the detected additional scatter level of the second light.

4. The device of claim 1, wherein the controller includes memory configured to store the detected scatter level of the first light and the detected scatter level of the second light.

5. The device of claim 1, wherein the first transmitter LED is an infrared (IR) LED.

6. The device of claim 1, wherein the second transmitter LED is a blue LED.

7. The device of claim 1, wherein the photodiode is an LED.

8. A method for operating a self-calibrating fire sensing device, comprising:
    generating aerosol having a particular particle size and optical scatter properties at a controllable density level using an adjustable particle generator and a variable airflow generator of the self-calibrating fire sensing device;
    emitting, by a first transmitter light-emitting diode (LED) of the self-calibrating fire sensing device, a first light that passes through the aerosol;
    emitting, by a second transmitter LED of the self-calibrating fire sensing device, a second light that passes through the aerosol;
    detecting, by a photodiode of the self-calibrating fire sensing device, a scatter level of the first light that passes through the aerosol;
    detecting, by the photodiode, a scatter level of the second light that passes through the aerosol; and
    recalibrating a gain of the photodiode based on the detected scatter level of the first light or the detected scatter level of the second light.

9. The method of claim 8, wherein recalibrating the gain of the photodiode comprises:
    comparing the detected scatter level of the first light to a threshold scatter level of the first light;
    comparing the detected scatter level of the second light to a threshold scatter level of the second light; and
    recalibrating the gain of the photodiode responsive to the detected scatter level of the first light being below the threshold scatter level of the first light or the detected scatter level of the second light being below the threshold scatter level of the second light.

10. The method of claim 8, wherein recalibrating the gain of the photodiode comprises:
    comparing the detected scatter level of the first light to a previously detected scatter level of the first light;
    comparing the detected scatter level of the second light to a previously detected scatter level of the second light; and
    recalibrating the gain of the photodiode responsive to the detected scatter level of the first light being less than the previously detected scatter level of the first light or the detected scatter level of the second light being less than the previously detected scatter level of the second light.

11. The method of claim 8, further comprising measuring ambient airflow outside of the self-calibrating fire sensing device using a sensor before generating the aerosol.

12. The method of claim 11, further comprising generating the aerosol responsive to the measured ambient airflow being within a particular airflow range.

13. The method of claim 8, further comprising recalibrating the gain of the photodiode based on settings of a heating, ventilation, and air conditioning (HVAC) system.

14. A fire alarm system, comprising:

a monitoring device; and a self-calibrating fire sensing device, comprising:

an adjustable particle generator and a variable airflow generator configured to generate aerosol having a particular particle size and optical scatter properties at a controllable density level;

a first transmitter light-emitting diode (LED) configured to emit a first light that passes through the aerosol;

a second transmitter LED configured to emit a second light that passes through the aerosol; and a photodiode configured to:

detect a scatter level of the first light that passes through the aerosol;

detect a scatter level of the second light that passes through the aerosol; and transmit the detected scatter level of the first light and the detected scatter level of the second light to the monitoring device.

15. The system of claim 14, wherein the monitoring device is configured to:

compare the detected scatter level of the first light to a threshold scatter level of the first light;

compare the detected scatter level of the second light to a threshold scatter level of the second light; and transmit a command to the self-calibrating fire sensing device responsive to the detected scatter level of the first light being below the threshold scatter level of the first light or the detected scatter level of the second light being below the threshold scatter level of the second light.

16. The system of claim 14, wherein the monitoring device is configured to:

compare the detected scatter level of the first light to a previously detected scatter level of the first light;

compare the detected scatter level of the second light to a previously detected scatter level of the second light; and transmit a command to the self-calibrating fire sensing device responsive to the detected scatter level of the first light being less than the previously detected scatter level of the first light or the detected scatter level of the second light being less than the previously detected scatter level of the second light.

17. The system of claim 14, wherein the self-calibrating fire sensing device is configured to receive a command from the monitoring device to recalibrate a gain of the photodiode.

18. The system of claim 14, wherein the self-calibrating fire sensing device is configured to transmit a message to the monitoring device.

19. The system of claim 18, wherein the self-calibrating fire sensing device is configured to transmit the message to the monitoring device responsive to the self-calibrating fire sensing device recalibrating a gain of the photodiode.

20. The system of claim 18, wherein the self-calibrating fire sensing device is configured to transmit the message to the monitoring device responsive to the self-calibrating fire sensing device failing to recalibrate a gain of the photodiode.

* * * * *